(12) United States Patent
Kasamatsu et al.

(10) Patent No.: US 8,204,089 B2
(45) Date of Patent: Jun. 19, 2012

(54) MODE LOCKED LASER DEVICE

(75) Inventors: Tadashi Kasamatsu, Ashigarakami-gun (JP); Shogo Yamazoe, Ashigarakami-gun (JP); Yutaka Korogi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 50 days.

(21) Appl. No.: 12/582,429

(22) Filed: Oct. 20, 2009

(65) Prior Publication Data

US 2010/0103960 A1    Apr. 29, 2010

(30) Foreign Application Priority Data

Oct. 23, 2008   (JP) .................................. 2008-273043

(51) Int. Cl.
*H01S 3/098* (2006.01)
(52) U.S. Cl. ................ 372/18; 372/40; 372/41; 372/75; 372/107
(58) Field of Classification Search .................... 372/18, 372/40, 41, 75, 107
See application file for complete search history.

(56) References Cited

U.S. PATENT DOCUMENTS

| | | | |
|---|---|---|---|
| 5,848,092 A | 12/1998 | Mitsumoto et al. | |
| 6,229,835 B1 * | 5/2001 | Tomaru et al. | 372/45.013 |
| 7,106,764 B1 * | 9/2006 | Weingarten et al. | 372/18 |
| 2002/0163727 A1 * | 11/2002 | Kartner et al. | 359/588 |
| 2003/0210730 A1 * | 11/2003 | Tomaru et al. | 372/101 |
| 2007/0223540 A1 * | 9/2007 | Sudmeyer et al. | 372/18 |
| 2007/0297464 A1 | 12/2007 | Adachi et al. | |

FOREIGN PATENT DOCUMENTS

| | | |
|---|---|---|
| EP | 1 870 972 A1 | 12/2007 |
| JP | 11-168252 A | 6/1999 |
| JP | 2000-252552 A | 9/2000 |
| JP | 3378103 B2 | 12/2002 |
| JP | 2008-028379 A | 2/2008 |

OTHER PUBLICATIONS

EP Communication, Jan. 29, 2010, issued in corresponding EP Application No. 09013301.8, 9 pages.

* cited by examiner

*Primary Examiner* — Kinam Park
(74) *Attorney, Agent, or Firm* — Sughrue Mion, PLLC

(57) ABSTRACT

There is provided a mode locked laser device including: a cavity, the cavity having a semiconductor saturable absorbing mirror and a negative dispersion mirror that controls group velocity dispersion within the cavity, disposed in a straight line; a solid-state laser medium, disposed in the cavity and outputting oscillating light due to excitation light being incident thereon; an excitation unit that causes the excitation light to be incident on the solid-state laser medium; and a cavity holder, the light incident face of the semiconductor saturable absorbing mirror attached to one end of the cavity holder, the negative dispersion mirror attached to the other end of the cavity holder, and the cavity holder integrally supporting the semiconductor saturable absorbing mirror and the negative dispersion mirror.

12 Claims, 2 Drawing Sheets

MODE LOCKED LASER DEVICE

CROSS-REFERENCE TO RELATED APPLICATION

This application claims priority under 35 USC 119 from Japanese Patent Application No. 2008-273043 filled on Oct. 23, 2008, the disclosure of which is incorporated by reference herein.

BACKGROUND

1. Technical Field

The present invention relates to a mode locked laser device, and in particular to a mode locked laser device that outputs an ultra short pulsed light.

2. Related Art

Solid-state lasers doped with rare earth ions (or transition metal ions) have been actively developed excited by semiconductor lasers (laser diodes). Among these, ultra short pulse lasers that generate so-called ultra short pulsed light in the femtosecond range are being sought and proposed for applications across many fields such as medicine, biotechnology, instrument manufacture, measurement and the like, and through experimentation some of these lasers are starting to be applied in practice.

These ultra short pulse lasers generate ultra short light pulses by operation in so-called mode locking In simple terms mode locking is a phenomenon in which, when looking at the frequency regions when lasing, all the phases of plural longitudinal modes are synchronized (relative phase difference=0), giving rise to extremely short duration pulses due to multi-mode interference between the longitudinal modes.

Generally a Semiconductor Saturable Absorbing Mirror (SESAM) is used as one of the mirrors configuring a laser cavity (resonator), and mode locked operation occurs as a result of the increase in the steepness of the pulse in the SESAM. In addition, since the spectral band of the pulse is broad in the femtosecond region, compensation is required for positive group velocity dispersion imparted on transmission through optical materials (laser crystal, cavity mirrors and the like) in a cavity.

In particular there is a method for obtaining a pulse in the femtosecond region called soliton mode locking, in which a SESAM is disposed as a cavity mirror, mode locking is induced, resulting in a self-phase modulation effect due to the light pulse circulating in the cavity and to compensation of group velocity dispersion. Such a method is capable of self-initiation and is becoming widely employed as an excellent practical method with greater tolerance of misalignment in comparison to other methods (such as Kerr lens mode locking and the like).

In the wide definition of mode locked lasers, without restriction to soliton mode locking, large two meter-class length cavities have been reported (see, for example, FIG. 1 of Japanese Patent No. 3378103), corresponding to a pulse repetition frequency of 80 MHz.

The Pulse Repetition Frequency (PRF) is represented by $PRF=C/2L_{cav}$, where C is the speed of light and $L_{cav}$ is the cavity length. When $L_{cav}$ is 2 m the corresponding PRF is 75 MHz. Large ultra short pulse lasers are capable of providing an appropriate pulse repetition frequency (50 MHz to 100 MHz) and relatively high peak power (100 kW to 1 MW). However, since a mirror or the like is used for cavity folding the cavity structure is complicated, with a tendency towards an increase in the number of components and higher costs, such as an increase in manufacturing cost and the like. In addition, with large lasers there is the generally low output stability is of concern. This arises due to larger beam position fluctuations incurred from the slightest mechanical fluctuation (positional misalignment) of the cavity mirror as the size increases, resulting in output fluctuations. Periodic mirror alignment is a prerequisite for normal ultra short pulse lasers, for example, optimal mirror adjustment is required each day when the laser is operated.

Consequently, high stability ultra short pulse lasers at reduced cost are expected to arise from implementing reductions in size of lasers. By reducing the size, the component cost can be lowered by reducing the number of components, and output fluctuations due to fluctuations in the cavity length and position of the cavity mirrors can also be suppressed to the minimum. Specifically, if the cavity length is 150 mm or less, or preferably 75 mm or less, an integrated cavity structure as described below can be employed, and the stability can be raised.

By adopting a linear structure as the configuration of a cavity, optical components for folding can be omitted, and the number of components can be minimized. A solid-state laser having such a structure is described in Japanese Patent No. 3378103, for example. An optical cavity is configured here with a cavity integrated to a metal holder, with mirror installation faces set at both end faces thereof, and with a laser crystal and cavity output mirror bonded and fixed with an extremely thin layer (2 μm or less) of adhesive having a volume shrinkage ratio of 1% or less. Compactness and extremely stable output characteristics are achieved thereby. The bonding face is mirror face-polished, and layer thickness of the bonding layer is precisely controlled. According to Japanese Patent No. 3378103 the change in cavity length is 0.02 μm after operation for 5000 hours in a normal atmosphere.

Linear compact ultra short pulse lasers are described in U.S. Pat. No. 7,106,764, Japanese Patent Application Laid-Open (JP-A) Nos. 11-168252 and 2008-28379. In each case a Semiconductor Saturable Absorbing Mirror (SESAM) required for mode locking is provided as one end of the cavity mirror. By placing the SESAM and the laser crystal adjacent or in close contact to each other, and providing a cavity waist on the SESAM, more compactness can be achieved with a linear configuration, in comparison to conventional cases where cavity spots are formed separately to the SESAM and the laser crystal.

The ultra short pulse laser described in U.S. Pat. No. 7,106,764 (in particular at FIG. 15) is a configuration that realizes a mode locked laser with high repetition frequency, specifically 1 GHz and greater. The objective of this invention is to realize a high repetition frequency, however the cavity length corresponding to 1 GHz is 15 cm, and therefore realization of a cavity length of 15 cm or lower is equivalent to realization of an ultra short pulse laser with high repetition frequency. U.S. Pat. No. 7,106,764 prescribes the stimulated emission cross-sectional area of the laser medium ($>0.8 \times 10^{-18}$ cm$^2$), the SESAM absorption depth ΔR (<0.5%), and the like.

In U.S. Pat. No. 7,106,764 a configuration is described with a linear laser cavity made from a curved mirror treated front end face of a laser crystal as an output mirror, and a SESAM disposed to the rear of the laser crystal. Configuration is also described for dispersion compensation by inducing negative dispersion by Gires-Tournois Interference (GTI) by etalon interference occurring between a SESAM and a laser crystal.

In JP-A No. 11-168252 (in particular FIG. 3) a compact ultra short pulse laser is described, with the objective of operating a ultra short pulse laser at a high repetition frequency. Specifically a liner mode locked laser is described configured with a saturable absorbing body that is coated on the rear end face of a laser crystal, and a curved chirp mirror (negative dispersion mirror).

In JP-A No. 2008-28379 (in particular FIG. 1) an extremely compact ultra short pulse laser is described, provided with a liner laser cavity configured from a negative dispersion mirror and a SESAM disposed adjacent to a laser crystal. This might be considered to be a good structure, with degrees of freedom for design and degrees of freedom for thermal interference and cavity length achieved by disposing the SESAM, negative dispersion mirror, and laser crystal separated from each other.

However, the central aim of the invention of Japanese Patent No. 3378103 is application of an integrated cavity structure to a semiconductor laser excitation solid-state laser. To be more precise, the main objective is to realize an internal cavity No. 2 high frequency laser that has continuous operation, a non-linear optical crystal disposed in the cavity, is compact, has high stability, and low cost. Consequently, there is no reference in Japanese Patent No. 3378103 to how to obtain an ultra short pulse laser that is compact, low cost and capable of high stability operation, if application were to be made to an ultra short pulse laser.

The ultra short pulse laser described in U.S. Pat. No. 7,106,764 is of semi-monolithic structure in which a laser cavity is joined to a laser crystal and SESAM, and there is no reference whatsoever to a cavity holder for disposing the laser crystal, SESAM, and the like. There is no reference in U.S. Pat. No. 7,106,764 to such matters as what sort of structure should be adopted in order to obtain an ultra short pulse laser that is compact, low cost and capable of high stability operation. In addition, while the structure described is favorable for anticipated operation with an actual repetition frequency of about 10 GHz (a monolithic structure with cavity length 1.5 cm), in contrast it would be difficult to realize a monolithic structure for 1 GHz (cavity length 15 cm) to 5 GHz (cavity length 5 cm), and application thereto is difficult.

Also, in the ultra short pulse laser described in JP-A No. 11-168252 there is a curve faced chirp mirror and laser crystal spatially separated from each other. However, there is no reference relating to a cavity holder for their support in JP-A No. 11-168252, and there is no reference to such matters as what sort of structure should be adopted in order to obtain an ultra short pulse laser that is compact, low cost and capable of high stability operation.

There is also no reference in JP-A No. 2008-28379 to a cavity holder for disposing optical components configuring the cavity separated from each other, and there is no reference therein in to such matters as what sort of structure should be adopted in order to obtain an ultra short pulse laser that is compact, low cost and capable of high stability operation.

As stated above, there is no reference made to configuration and structure of a cavity holder in the inventions related to ultra short pulse lasers described in U.S. Pat. No. 7,106,764, JP-A No. 11-168252, and JP-A No. 2008-28379, and specifically there is no reference to how implementation should be made to realize an ultra short pulse laser that is compact, low cost and capable of high stability operation. There is also no consideration relating to stability, such as to prescribed structures of cavity, temperature control of cavity length, and the like.

SUMMARY

In consideration of the above circumstances, the present invention provides a mode locked laser device that outputs an ultra short pulse, providing a mode locked laser device that is compact, low cost and has high stability of operation.

In order to solve the above problems, an aspect of the present invention provides a mode locked laser device including:

a cavity, the cavity having a semiconductor saturable absorbing mirror and a negative dispersion mirror that controls group velocity dispersion within the cavity, disposed in a straight line;

a solid-state laser medium, disposed in the cavity and outputting oscillating light due to excitation light being incident thereon;

an excitation unit that causes the excitation light to be incident on the solid-state laser medium; and a cavity holder, the light incident face of the semiconductor saturable absorbing mirror attached to one end of the cavity holder, the negative dispersion mirror attached to the other end of the cavity holder, and the cavity holder integrally supporting the semiconductor saturable absorbing mirror and the negative dispersion mirror.

According to the present invention, since configuration is made with the light incident face of the semiconductor saturable absorbing mirror attached to one end of a cavity holder, a cavity holder can be constructed at high precision more easily and at a lower cost in comparison to cases where the light incident face of a semiconductor saturable absorbing mirror is attached to the face on the opposite side of a semiconductor saturable absorbing mirror to the light incident face thereof. The semiconductor saturable absorbing mirror can therefore be readily attached to the cavity holder with good precision, resulting in attainability of compactness, low cost and highly stable operation.

The dispersion amount of the negative dispersion mirror may be from $-3000$ fs$^2$ to $0$ fs$^2$, and the transmissivity of the negative dispersion mirror may be from 0.1% to 3%.

The cavity length may be 150 mm or less.

More preferably, the cavity length may be 75 mm or less.

The mode locked laser device of the present invention may further include a temperature adjustment unit that adjusts the temperature of the cavity holder.

The cavity holder can thereby be maintained at a constant temperature, and output can be suppressed from becoming unstable due to variation in cavity length.

The solid-state laser medium is made from one of: Yb: KYW(KY(WO$_4$)$_2$); Yb: KGW(KGd(WO$_4$)$_2$); Yb: YAG (Y$_3$Al$_5$O$_{12}$); Yb: YLF(LiYF$_4$); Yb:YVO$_4$; Nd: YAG; Nd: YVO$_4$; Nd: glass; Cr: LiSAF(LiSrAlF$_6$); Cr: LiCAF(LiCaAlF$_6$); and Ti: sapphire.

The solid-state laser medium may be attached to the cavity holder at an angle of 2° to 5° with respect to a direction orthogonal to the cavity axis of the cavity.

The cavity, the solid-state laser medium, the excitation unit and the cavity holder may be sealed with a sealing member.

The mode locked laser device of the present invention may further include:

a detection unit that detects light output from the cavity; and a control unit that controls the excitation unit such that the intensity of light detected by the detection unit is constant.

The present invention has the effect of being able to provide a mode locked laser device outputting an ultra short pulse, the mode locked laser device being compact, low cost and capable of high stability of operation.

BRIEF DESCRIPTION OF THE DRAWINGS

Exemplary embodiments of the present invention will be described in detail based on the following figures, wherein.

DETAILED DESCRIPTION

Explanation will now be given of an exemplary embodiment of the present invention, with reference to the drawings.

Figure 1A:
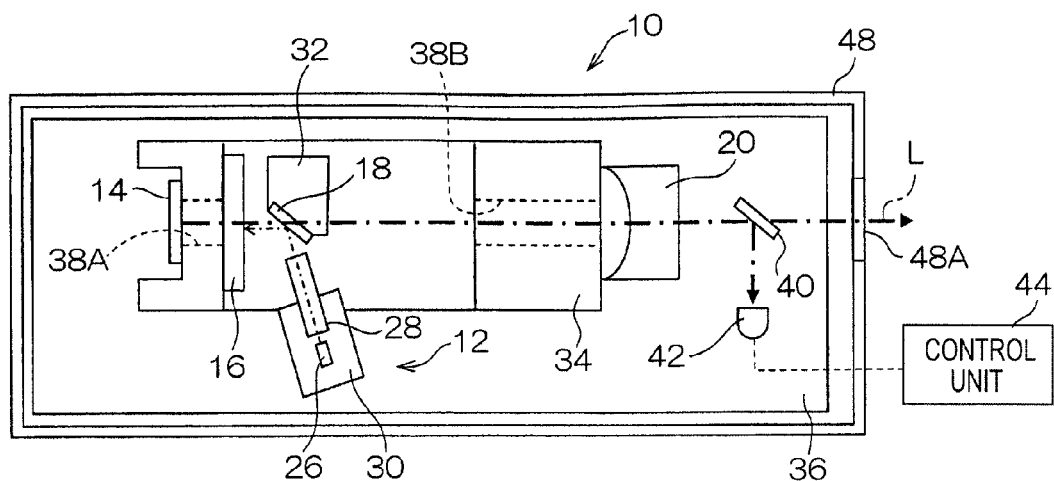
FIG. 1A is a plan view of a mode locked laser device.
Figure 1B:
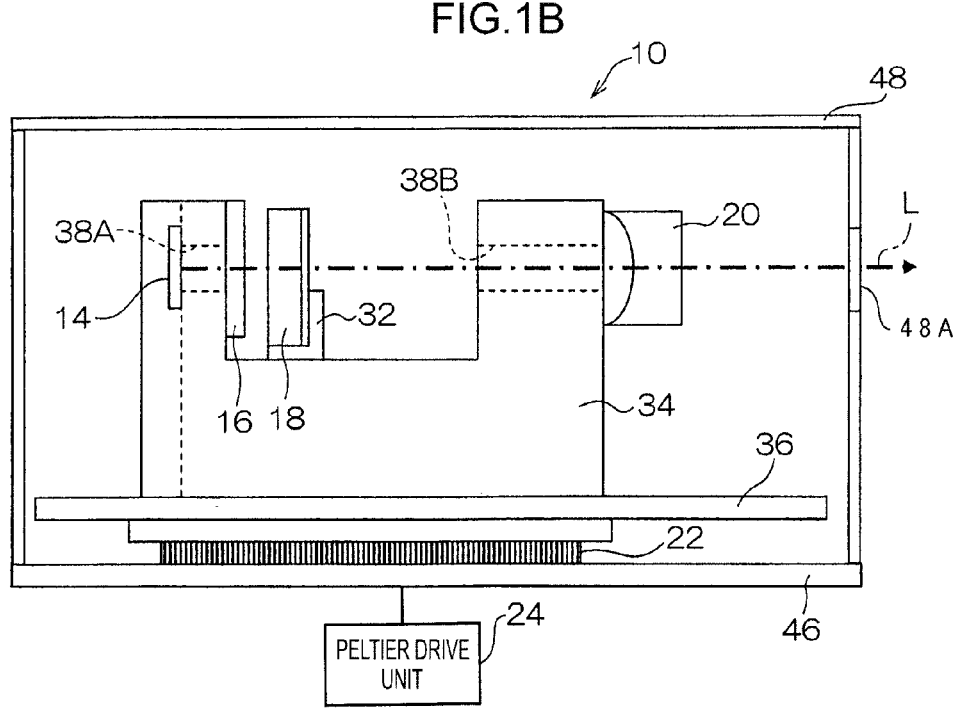
FIG. 1B is a side view corresponding to FIG. 1A.

A schematic plan view of a mode locked laser device 10 is illustrated in FIG. 1A, and a schematic side view thereof is illustrated in FIG. 1B. As shown in FIGS. 1A and 1B, the mode locked laser device 10 is configured including: an excitation light optical system 12; a SESAM 14; a solid-state laser medium 16; a dichroic mirror 18; a negative dispersion mirror 20; a Peltier device 22; a Peltier drive unit 24; a beam splitter 40; a photodiode 42; and a control unit 44.

As shown in FIG. 1A, the excitation light optical system 12 is configured including a semiconductor laser 26, serving as an excitation light source, and a SELFOC lens 28, these components being fixed, by for example adhesive, onto an excitation light optical system holder 30, configured by a component made from copper, for example.

A dichroic mirror holder 32, to which the SESAM 14, the solid-state laser medium 16, the negative dispersion mirror 20, and the dichroic mirror 18 are attached, is fixed to a cavity holder 34, for example by bonding. The excitation light optical system 12 is omitted in the view shown in FIG. 1B.

The cavity holder 34, as shown in FIG. 1B, is of a substantially U-shape, formed with holes 38A, 38B for letting pulsed light L pass therethrough. The cavity holder 34 preferably employs a metal of high heat transmissivity and high rigidity, with copper being preferable. Copper to which Te has been added is more preferable in consideration of machinability.

The excitation light optical system holder 30 and the cavity holder 34 are fixed onto a copper plate 36 shown in FIG. 1B.

The Peltier device 22 provided on a substrate 46, described below, is attached to the copper plate 36. The excitation light optical system 12, the SESAM 14, the solid-state laser medium 16, the dichroic mirror 18, the negative dispersion mirror 20, the Peltier device 22, the beam splitter 40, and the photodiode 42 are tightly sealed and isolated from the outside using a sealing member 48 on the substrate 46. A transmission window 48A is provided in the sealing member 48, in order to externally output the pulsed light L.

Various known methods can be employed for the sealing method of the sealing member 48 to the substrate 46, such as, for example, welding by laser welding, electric welding or the like, bonding by seam bonding, solder application, adhesive or the like, or by another known method.

The SESAM 14 is a semiconductor saturable absorber mirror device, and, for example, in the present exemplary embodiment the SESAM 14 has a modulation depth ($\Delta R$) of 0.6% and a saturation fluence of 70 $\mu J/cm^2$.

A cavity is configured by the SESAM 14 and the negative dispersion mirror 20. The cavity length of this cavity is preferably as short as possible within a range in which the cavity and the cavity holder 34 for integrally supporting the solid-state laser medium 16 etc. can be manufactured with sufficient precision. Specifically, in consideration of the mechanical fluctuations of components due to temperature variation the cavity length is preferably 150 mm or less, and more preferably 75 mm or less.

The solid-state laser medium 16 is, for example, a Ytterbium (Yb) doped solid-state laser crystal, and specific examples thereof include Yb: KYW(KY(WO$_4$)$_2$), Yb: KGW (KGd(WO$_4$)$_2$), Yb: YAG(Y$_3$Al$_5$O$_{12}$), Yb: YLF(LiYF$_4$), Yb:YVO$_4$ and the like. There is however no limitation thereto, and an Nd-doped (Nd:YAG, Nd:YVO$_4$, Nd: glass) or a transition metal-doped (Cr: LiSAF(LiSrAlF$_6$), Cr: LiCAF (LiCaAlF$_6$), Ti: sapphire, or the like) solid-state laser medium 16 may also be employed.

The thickness and concentration of the solid-state laser medium 16 is set so as to be able to give sufficient excitation light absorption, for example a 90% absorption efficiency. For example, in the present exemplary embodiment the thickness is 1.5 mm, the Yb doping concentration is 5 at. %. Both faces of the solid-state laser medium 16 are optically polished and treated with an antireflection coating with low reflection (for example a reflectivity of 0.5% or less) to the emission light wavelength (for example at 1045 nm) and to the excitation light wavelength (for example 980 nm).

Such a solid-state laser medium 16 is bonded to the cavity holder 34 using a method, such as for example the method described in Japanese Patent 3450073.

It should be noted that while in FIG. 1A the solid-state laser medium 16 is disposed such that the light incident face and the light emitting face thereof are orthogonal to the cavity axis, the solid-state laser medium 16 may be disposed so as to be angled at a few degrees (for example 2° to 5°) to a direction orthogonal to the cavity axis. Thereby enabling suppression of components (satellite components) from the light pulse circulating in the cavity which are residually reflected at the interface of each of the optical components. It should be noted that if angled above such figures then sometimes distortion occurs in the beam shape due to astigmatism, and also internal loss is sometimes incurred due to the angular dependency of the reflectivity of the antireflection coating applied to the crystal.

The dichroic mirror 18 folds excitation light from the excitation light optical system 12 toward the solid-state laser medium 16, and, for example, is treated with a coating having a high reflectance (for example 95% or greater) to the excitation light wavelength, and a low reflectance (for example 0.2% or less) to the emission light wavelength. This thereby enables the realization of highly efficient excitation and low internal loss.

The dichroic mirror 18 that is fixed to the dichroic mirror holder 32 is disposed in the cavity, namely between the SESAM 14 and the negative dispersion mirror 20, so as to form a Brewster angle to the cavity optical axis.

The negative dispersion mirror 20 has the roles of compensating for group velocity dispersion in the cavity and also compensating for positive chirp occurring in the solid-state laser medium 16 due to self-phase modulation. While the dispersion amount depends on operational conditions, the dispersion amount is preferably about 0 to −3000 fsec$^2$. For example, in the present exemplary embodiment the dispersion amount of the negative dispersion mirror 20 is −800 fsec$^2$.

In addition, when the reflectance is high (for example a reflectance of 99.8%) the transmissivity T of the negative dispersion mirror 20 is 0.2%, and by mirror design the optimal output can be extracted by, for example, setting the output to supply ratio at 0.5 to 3%. As an example, in the present exemplary embodiment the transmissivity is set at 1.8%.

The radius of curvature of the negative dispersion mirror 20 is derived by Gaussian beam propagation calculation of the cavity, and the negative dispersion mirror 20 is preferably given a radius of curvature of about the same as the cavity length, made hemispherical, in order to make the cavity spot diameter as small as possible. The cavity spot diameter can thereby be suppressed to about 50 μm, and the Q-switching phenomenon that accompanies short cavities can be avoided. Also, spatial matching can preferably be made with the spot diameter of the excitation light, in order to achieve increased efficiency. As an example, in the present exemplary embodiment the cavity length is 50 mm and the radius of curvature of the negative dispersion mirror 20 is also set at 50 mm, the same as the cavity length.

The excitation light optical system 12 outputs excitation light toward the dichroic mirror 18 from a direction angled with respect to the cavity axis, and the solid-state laser medium 16 is excited by excitation light reflected by the dichroic mirror 18 and introduced into the solid-state laser medium 16.

A solid-state laser outputting excitation light of wavelength 980 nm, emitter width of 50 μm, and power of 2 W can, for example, be employed for the semiconductor laser 26 of the excitation light optical system 12.

The excitation light emitted from the semiconductor laser 26 is focused by the SELFOC lens 28. An example of the focused spot diameter is about 50 μm ø. The thickness and concentration of the laser crystal is set to enable sufficient excitation light absorption, for example a 90% absorption efficiency.

The Peltier device 22 is attached to the copper plate 36, which in turn has the cavity holder 34 and the excitation light optical system holder 30 attached thereto, the cavity holder 34 having the SESAM 14, the solid-state laser medium 16, the negative dispersion mirror 20 and the dichroic mirror holder 32 fixed thereon.

The cavity holder 34 and the excitation light optical system holder 30 are adjusted in temperature with the Peltier device 22. The Peltier device 22 is driven by the Peltier drive unit 24.

Consequently, since the cavity holder 34 is adjustable in temperature, even if the temperature of the external environment fluctuates, the cavity can be held at a constant temperature, and variation in the cavity length and positional displacement of various components, such as the mirror etc., can be suppressed to a minimum. An ultra short pulsed light can thereby be output with extremely stable output.

In addition, since the excitation light optical system holder 30 is temperature adjustable, fluctuations in wavelength of the semiconductor laser 26 and fluctuations in relative position of the semiconductor laser 26, such as to the excitation light optical system 12, due to fluctuations in the temperature of the semiconductor laser 26 can be suppressed.

Since configuration is made with the SESAM 14, the solid-state laser medium 16, the negative dispersion mirror 20, and the dichroic mirror holder 32 fixed to the single cavity holder 34, there is no need to separately prepare a holder for each of the components, a simple and compact configuration can be made, and the device can be manufactured at low cost.

Part of the light output from the cavity is reflected in the direction of the photodiode 42 by the beam splitter 40, and the rest of this light is externally output from the transmission window 48A.

The photodiode 42 detects, for example, the intensity of the light reflected by the beam splitter 40, and converts the detection into a signal and outputs the signal to the control unit 44. The control unit 44 performs constant power control, controlling the semiconductor laser 26 such that the light intensity detected by the photodiode 42 is substantially constant. The average output of the mode locked laser device 10 can thereby be maintained substantially constant.

Also, as shown in FIGS. 1A and 1B, the light incident face of the SESAM 14, on which light transmitted through the solid-state laser medium 16 is incident, is applied with adhesive, at locations thereof other than where the light is transmitted through, and bonded to the cavity holder 34. By configuration in this manner, with the light incident face of the SESAM 14 bonded to one end of the cavity holder 34, any heat generated in the SESAM 14 can be efficiently dissipated, and operationally instability that accompanies distortion due to heat can be eliminated as far as possible. It should be noted that, in a similar manner to in the Japanese Patent No. 3378103 mentioned above, preferably a layer thickness of 2 μm or less of an adhesive having a curing shrinkage and change in thickness due to stress of 1% or less, is employed for the adhesive used when bonding the SESAM 14 to the cavity holder 34.

Figure 2A:
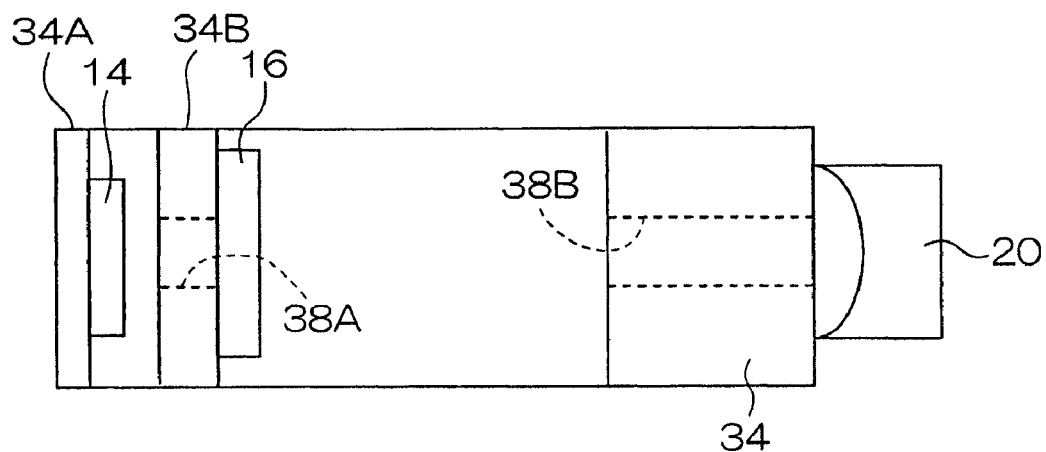
FIG. 2A is a plan view of a cavity holder according to an exemplary modification.
Figure 2B:
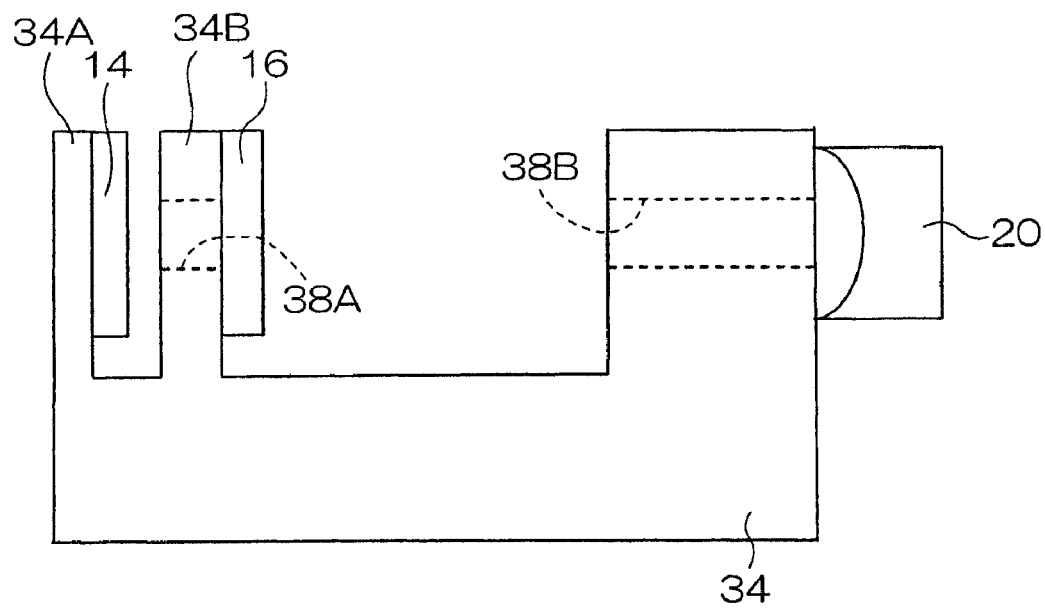
FIG. 2B is a side view corresponding to FIG. 2A.

A configuration such as, for example, the structure shown in FIGS. 2A and 2B is envisaged when constructing with the opposite face (back face) of the SESAM 14 to the light incident face (front face) stuck to the cavity holder. However, in a structure such as shown in FIGS. 2A and 2B, it is necessary to make the distance of the gap separating the protrusions 34A, 34B of the cavity holder 34 as small as is possible in order to place the SESAM 14 adjacent to the solid-state laser medium 16, and manufacturing cost becomes high due to the difficulty in high precision machining the cavity holder 34 into the shape shown in FIGS. 2A and 2B. Uniformly bonding the SESAM 14 to the protrusion 34A in the extremely narrow gap between the protrusions 34A, 34B is also extremely difficult.

By bonding the front face of the SESAM 14 to one end of the cavity holder 34 in the manner of the mode locked laser device 10 of the present exemplary embodiment, the cavity holder 34 can be readily manufactured with high precision, and uniform bonding can also be made.

The inventors have confirmed that an ultra short pulsed light of average output 600 mW, pulse width of 200 fsec, repetition frequency of 2.9 GHz, and peak power of 1 kW can be output with the mode locked laser device 10 configured as above. It has also been confirmed, by executing long duration running tests with the mode locked laser device 10 for durations of 3000 hours and greater, that even during temperature cycling tests (10° C. to 45° C.), and even without application of any particular power control, fluctuations in output can be suppressed to 10% or less.

In this manner, stable power output can be obtained without the need for power stability control, in contrast to current large mode locked laser devices that require daily alignment adjustment.

In addition, by performing constant power control as described above, even more stable output is obtained. The present inventors have confirmed, through executing tests of 1000 hours duration in which constant power control was performed, that output fluctuations become ±0.5%, and output stability is greatly raised in comparison the above mentioned long duration running tests in which constant power control is not performed.

Also, since the repetition frequency of mode locked laser devices outputting ultra short pulse lasers has an inverse proportional relationship to cavity length, this frequency can be held extremely steady when the cavity length is held extremely steady. The mode locked laser device 10 according to the present exemplary embodiment is, for example, extremely effective when employed as a precision clock light source, in time resolution measurement, and in sampling measurement. In addition, by time-locking two mode locked laser devices outputting ultra short pulse lasers, application is possible, for example, to non-linear optical processes, such as coherent anti-Stokes Raman scattering and the like, by mingling two or more photons together.

Furthermore, the stability of the repetition frequency leads to stability of jitter. Jitter can be considered as mainly being caused by short duration (of frequency 1 MHz or less) mechanical fluctuations of the mirror, and the mode locked laser device 10 according to the present exemplary embodiment can also effectively suppress jitter by stable operation in the manner described above, in comparison to a large mode locked laser device. The present inventors have operated the mode locked laser device 10 according to the present exemplary embodiment and measured the jitter, and jitter of 120 fsec and less has been achieved.

It should be noted that in mode locked laser devices outputting an ultra short pulse light, since the light pulse circulating in the cavity is 1/T times the pulse outside the cavity, where T is the transmissivity of the negative dispersion mirror 20, in the mode locked laser device 10 according to the present exemplary embodiment a light pulse with a 1 kW/(0.018)=56 kW peak power circulates. This is an intensity that can cause 2 photon absorption in various inorganic materials, such as, for example, out-gas from adhesive, copper wire coverings and the like, oil components in the atmosphere, and the like. The present inventors have observed the occurrence of photochemical reactions due to two photon absorption, through the deposition of solids in long duration tests.

In order to address this issue, the substrate 46 and each component are tightly sealed by the sealing member 48, and isolated from the outside, in the mode locked laser device 10 according to the present exemplary embodiment. Impurities from the external atmosphere can thereby be prevented from floating and penetrating therein. Consequently, the output stability of the ultra short pulsed light can be raised. The present inventors have confirmed that the mode locked laser device 10 with such a tightly sealed structure suppresses output fluctuations to 5% or less even when constant power control as described above is not performed.

What is claimed is:

1. A mode locked laser device comprising:
   a cavity, the cavity having a semiconductor saturable absorbing mirror and a negative dispersion mirror that controls group velocity dispersion within the cavity, disposed in a straight line;
   a solid-state laser medium, disposed in the cavity and outputting oscillating light due to excitation light being incident thereon;
   an excitation unit that causes the excitation light to be incident on the solid-state laser medium; and
   a cavity holder,
   a cavity holder that includes a retaining portion located at a first end of the cavity holder and which is interposed between and retains the semiconductor saturable absorbing mirror and the solid-state laser medium such that the light incident face of the semiconductor saturable absorbing mirror is attached to an external face of said retaining portion of the cavity holder, the solid-state laser medium attached to an internal face of said retaining portion of the cavity holder, the negative dispersion mirror attached to a second end of the cavity holder, and the cavity holder integrally supporting the semiconductor saturable absorbing mirror and the negative dispersion mirror.

2. The mode locked laser device of claim 1, wherein the dispersion amount of the negative dispersion minor is from $-3000$ $fs^2$ to $0$ $fs^2$, and the transmissivity of the negative dispersion minor is from 0.1 to 3.

3. The mode locked laser device of claim 1, wherein the cavity length is 150 mm or less.

4. The mode locked laser device of claim 3, wherein the cavity length is 75 mm or less.

5. The mode locked laser device of claim 1, further comprising a temperature adjustment unit that adjusts the temperature of the cavity holder.

6. The mode locked laser device of claim 1, wherein the solid-state laser medium is made from one of: Yb: KYW(KY($WO_4$)$_2$); Yb: KGW(KGd($WO_4$)$_2$); Yb: YAG($Y_3Al_5O_{12}$); Yb: YLF(LiYF$_4$); Yb: YVO$_4$; Nd: YAG; Nd: YVO$_4$; Nd: glass; Cr: LiSAF(LiSrAlF$_6$); Cr: LiCAF(LiCaAlF$_6$); and Ti: sapphire.

7. The mode locked laser device of claim 1, wherein the solid-state laser medium is attached to the cavity holder at an angle of 2° to 5° with respect to a direction orthogonal to the cavity axis of the cavity.

8. The mode locked laser device of claim 1, wherein the cavity, the solid-state laser medium, the excitation unit and the cavity holder are sealed with a sealing member.

9. The mode locked laser device of claim 1, further comprising:
   a detection unit that detects light output from the cavity; and
   a control unit that controls the excitation unit such that the intensity of light detected by the detection unit is constant.

10. The laser device of claim 1, wherein the first and second ends of the cavity holder are disposed opposite to each other in a longitudinal direction of the cavity holder, and the internal and external faces of the first end are disposed opposite to each other.

11. The laser device of claim 1, wherein a gap is disposed between the negative dispersion mirror and an external face of the second end of the cavity holder.

12. The laser device of claim 1, wherein the excitation unit causes the excitation light to be incident on the solid-state laser medium from the internal face side of a first end of the cavity holder.

* * * * *